(12) United States Patent
Ruud et al.

(10) Patent No.: US 8,328,921 B2
(45) Date of Patent: Dec. 11, 2012

(54) DYE-BASED GRAY INK FORMULATIONS, METHODS OF MAKING DYE-BASED GRAY INK FORMULATIONS, AND INK-JET INK SETS

(75) Inventors: Cory J. Ruud, Corvallis, OR (US); Mary E. Austin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 337 days.

(21) Appl. No.: 12/743,803

(22) PCT Filed: Nov. 20, 2007

(86) PCT No.: PCT/US2007/085168
§ 371 (c)(1),
(2), (4) Date: May 19, 2010

(87) PCT Pub. No.: WO2009/067107
PCT Pub. Date: May 28, 2009

(65) Prior Publication Data
US 2010/0288161 A1    Nov. 18, 2010

(51) Int. Cl.
*C09D 11/02*    (2006.01)

(52) U.S. Cl. ............... 106/31.27; 106/31.48; 106/31.49; 106/31.52

(58) Field of Classification Search ............... 106/31.27, 106/31.48, 31.49, 31.52
See application file for complete search history.

(56) References Cited

U.S. PATENT DOCUMENTS

| | | | |
|---|---|---|---|
| 6,014,226 A | 1/2000 | Harrington et al. | |
| 6,059,404 A | 5/2000 | Jaeger et al. | |
| 6,264,300 B1 | 7/2001 | Warner | |
| 6,277,185 B1 | 8/2001 | Watson et al. | |
| 6,459,501 B1 | 10/2002 | Holmes | |
| 6,503,308 B2 * | 1/2003 | Stramel et al. | 106/31.27 |
| 7,005,003 B2 | 2/2006 | Mott et al. | |
| 7,033,423 B2 | 4/2006 | Rolly | |
| 7,204,873 B2 | 4/2007 | Bauer et al. | |
| 7,294,186 B2 | 11/2007 | Bauer et al. | |
| 7,465,345 B2 * | 12/2008 | Okuda et al. | 106/31.28 |
| 7,533,980 B2 * | 5/2009 | Bauer et al. | 347/100 |
| 7,566,362 B2 * | 7/2009 | Mori et al. | 106/31.48 |
| 7,703,909 B2 * | 4/2010 | Bauer et al. | 106/31.27 |
| 7,846,245 B2 * | 12/2010 | Parazak et al. | 106/31.48 |
| 7,887,627 B2 * | 2/2011 | Rengaswamy et al. | 106/31.52 |
| 2004/0194661 A1 | 10/2004 | Taguchi et al. | |
| 2005/0087099 A1 | 4/2005 | Blease et al. | |
| 2005/0087100 A1 | 4/2005 | Blease et al. | |
| 2005/0128268 A1 * | 6/2005 | Takashima | 347/100 |
| 2005/0171240 A1 | 8/2005 | Bauer et al. | |
| 2006/0012655 A1 * | 1/2006 | Gondek et al. | 347/100 |

(Continued)

FOREIGN PATENT DOCUMENTS

EP    0831133    10/2001

(Continued)

OTHER PUBLICATIONS

WOISR dated Aug 10 2008.
European Search Report from the European Patent Office dated Oct. 10, 2010 (3 pages) for counterpart EP patent application EP07868793 to parent PCT application No. PCT/US07/85168 of present US application.

*Primary Examiner* — Helene Klemanski

(57) ABSTRACT

Dye-based gray ink formulations, ink-jet ink sets, and methods of making a dye-based gray ink formulation, are disclosed.

36 Claims, 5 Drawing Sheets

Structure A

U.S. PATENT DOCUMENTS

| | | |
|---|---|---|
| 2006/0098068 A1 | 5/2006 | Hakamada et al. |
| 2006/0232650 A1 | 10/2006 | Sugimoto et al. |
| 2007/0095250 A1 | 5/2007 | Uhlir-Tsang et al. |
| 2007/0097193 A1 | 5/2007 | Ma et al. |
| 2007/0120926 A1 | 5/2007 | Doumaux et al. |

FOREIGN PATENT DOCUMENTS

| | | |
|---|---|---|
| EP | 1533349 A2 | 5/2005 |
| EP | 1616917 A1 | 1/2006 |
| EP | 1690904 A1 | 8/2006 |
| WO | 2007032377 | 3/2007 |

* cited by examiner

Structure A

Structure B

Structure C

Structure D

TABLE I

| Cyan Dye | $R_1$ | k | $R_2$ | l |
|---|---|---|---|---|
| C1 | $-SO-(CH_2)_3-SO_3Li$ | 3 | $-SO_2-(CH_2)_3-SO_2NH-CH_2CH(OH)CH_3$ | 1 |
| C2 | $-SO_2-(CH2)_3-SO_3K$ | 2 | $-SO_2-(CH_2)_3-SO_2NH-C_2H_4OC_2H_4OH$ | 2 |
| C3 | $-SO_2-(CH_2)_3-SO_3K$ | 3 | $-SO_2-(CH_2)_3-SO_2NH-C_2H_4OC_2H_4OH$ | 1 |
| C4 | $-SO_2-(CH_2)_3-SO_3Li$ | 2.7 | $-SO_2-(CH_2)_3-SO_2NH-CH_2CH(OH)CH_3$ | 1.3 |
| C5 | $-SO_2-(CH_2)_3-SO_3Li$ | 2 | $-SO_2-(CH_2)_3-SO_2NH-CH_2CH(OH)CH_3$ | 2 |

FIG. 5

TABLE 2-A Dye blend compositions

| final wt% solid dye in ink | Cyan dye #1 | Blue dye #1 | Magenta dye #1 | Yellow dye #1 | Yellow dye #2 | Total % of dye in ink | Fraction of each color in the blend | | |
|---|---|---|---|---|---|---|---|---|---|
| | | | | | | | cyan or blue | magenta | yellow |
| EX 1 | 0.49% | | 0.36% | 0.43% | | 1.27% | 0.38 | 0.28 | 0.34 |
| EX 2 | 1.22% | | 0.86% | 1.03% | | 3.10% | 0.39 | 0.28 | 0.33 |
| EX 3 | 0.35% | | 0.27% | | 0.36% | 0.98% | 0.36 | 0.27 | 0.37 |
| EX 4 | 1.20% | | 0.87% | | 1.29% | 3.37% | 0.36 | 0.26 | 0.38 |
| EX 5 | | 0.23% | 0.24% | 0.29% | | 0.77% | 0.30 | 0.32 | 0.38 |
| EX 6 | | 0.68% | 0.71% | 0.85% | | 2.24% | 0.30 | 0.32 | 0.38 |
| EX 7 | | 0.29% | 0.31% | | 0.37% | 0.97% | 0.30 | 0.32 | 0.38 |
| EX 8 | | 0.86% | 0.91% | | 1.08% | 2.84% | 0.30 | 0.32 | 0.38 |
| EX 9 | 2.16% | | 1.63% | | 2.21% | 5.99% | 0.36 | 0.27 | 0.37 |
| CE 1 | Light gray ink in HP # 59 or # 100 cartridge | | | | | | | | |
| CE 2 | Medium gray ink in HP # 59 or # 100 cartridge | | | | | | | | |

FIG. 6

TABLE 2-B: Aqueous Ink Formulation used for EX 1 - 9

| Dye blends | see Table 2A |
|---|---|
| 2-pyrrolidinone | 6.5% |
| 1,5-pentanediol | 2.0% |
| Trimethylolpropane | 9.0% |
| Tergitol 15-S-7 | 2.0% |
| Dowfax 8390 | 0.6% |
| EDTA disodium salt | 0.1% |
| Trizma Base | 0.2% |
| Proxel GXL | 0.1% |
| water | balance |

FIG. 7

**Table 3: Neutrality and L* range measured at D65**

| | @ minimum L* | | | L* range |
|---|---|---|---|---|
| | a* | b* | C* | |
| EX1 | -0.21 | -2.76 | 2.77 | 90 - 60 |
| EX2 | 0.54 | -5.22 | 5.25 | 85 - 35 |
| EX3 | -0.81 | -3.13 | 3.23 | 90 - 65 |
| EX4 | -0.51 | -3.67 | 3.71 | 85 - 35 |
| EX5 | -0.94 | -1.56 | 1.82 | 90 - 65 |
| EX6 | -0.90 | -2.84 | 2.98 | 85 - 35 |
| EX7 | -0.50 | -2.09 | 2.15 | 90 - 65 |
| EX8 | -0.71 | -3.32 | 3.40 | 85 - 40 |
| EX9 | 3.2 | -8.2 | 8.8 | 80 - 17 |
| CE 1 | -0.55 | -2.34 | 2.40 | 90 - 65 |
| CE 2 | -0.36 | -2.22 | 2.25 | 84 - 36 |

| | a* | b* | C* | L* |
|---|---|---|---|---|
| HP Advanced Photopaper | -0.48 | -3.15 | 3.18 | 95.16 |

FIG. 8

Table 4: Image Stability

| | Light resistance | Ozone resistance | Humidity resistance | Metamerism (D50, D65, F11) |
|---|---|---|---|---|
| EX1 | 4 | 3 | 3 | 3 |
| EX2 | 4 | 4 | 2 | 3 |
| EX3 | 3 | 3 | 3 | 3 |
| EX4 | 2 | 4 | 2 | 3 |
| EX5 | 2 | 2 | 3 | 2 |
| EX6 | 3 | 2 | 2 | 3 |
| EX7 | 2 | 2 | 3 | 3 |
| EX8 | 2 | 2 | 2 | 2 |
| EX9 | | | 3 | |
| CE 1 | 4 | 1 | 1 | 3 |
| CE 2 | 4 | 1 | 1 | 3 |

FIG. 9

DYE-BASED GRAY INK FORMULATIONS, METHODS OF MAKING DYE-BASED GRAY INK FORMULATIONS, AND INK-JET INK SETS

BACKGROUND

The use of inkjet printing systems in offices and homes has grown dramatically in recent years. The growth can be attributed to drastic reductions in cost of inkjet printers and substantial improvements in print resolution and overall print quality. While the print quality has drastically improved, research and development efforts continue toward improving the permanence of inkjet images, particularly on porous media, because this property still falls short of the permanence produced by other printing and photographic techniques. A continued demand in inkjet printing has resulted in the need to produce images of high quality, high permanence, and high durability, while maintaining a reasonable cost. In particular, there is a demand for inkjet printing on porous media that can produce documents and photographs that can be kept for long periods of time without fading due to ozone and/or light.

SUMMARY

Briefly described, embodiments of this disclosure include dye-based gray ink formulation, ink-jet ink set, and method of making a dye-based gray ink formulation, are disclosed. One exemplary dye-based gray ink formulation, among others, includes a yellow dye, a magenta dye, and a cyan dye, wherein dye-based gray ink formulation has a L* of about 10 to 90 and a c*<10. In an embodiment, the dye-based gray ink formulation does not include a black dye.

Another exemplary ink-jet ink set, among others, includes a plurality of colored inks, and dye-based gray ink formulation. The dye-based gray ink formulation includes a yellow dye, a magenta dye, and a cyan dye, wherein dye-based gray ink formulation has a L* of about 10 to 90 and a c*<10. In an embodiment, the dye-based gray ink formulation does not include a black dye.

An exemplary method of making a dye-based gray ink formulation, among others, includes mixing at least one dye from each of the following: a yellow dye, a magenta dye, and a cyan dye; and dye-based gray ink formulation, comprising: a yellow dye, a magenta dye, and a cyan dye, wherein dye-based gray ink formulation has a L* of about 10 to 90 and a c*<10. In an embodiment, the dye-based gray ink formulation does not include a black dye.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding parts throughout the several views.

FIG. 5 shows Table 1, which includes a list of R groups that define embodiments of cyan dyes corresponding to structure C in FIG. 3.

FIG. 6 shows Table 2a that describes embodiments of example dye blends 1-9.

FIG. 7 shows Table 2b that describes embodiments of the ink vehicle used with the dye blends described in Table 2a.

FIG. 8 shows Table 3 that describes the neutrality (a* b* c*) and L* information measured at D65 illumination conditions when embodiments of the inks described by Tables 2a and 2b were printed on HP Advanced Photopaper using an HP Deskjet 6540 printer.

FIG. 9 shows Table 4 that describes the lightfastness, ozonefastness, humidity resistance, and metamerism results for the embodiments of the inks shown in Table 2 relative to comparative examples.

DETAILED DESCRIPTION

Figure 1:
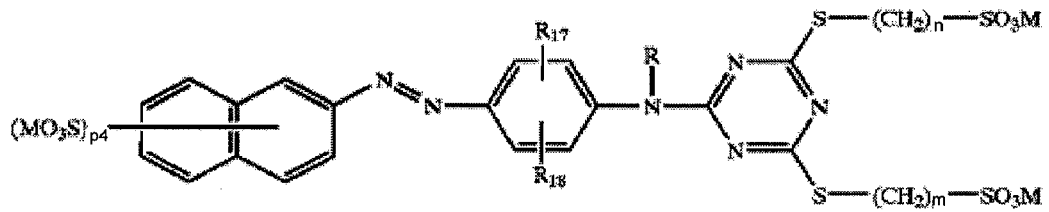
FIG. 1 illustrates an illustrative embodiment of yellow dyes defined by structure A.

Embodiments of the present disclosure will employ, unless otherwise indicated, techniques of synthetic organic chemistry, ink chemistry, media chemistry, and the like, that are within the skill of the art. Such techniques are explained fully in the literature.

The following examples are put forth so as to provide those of ordinary skill in the art with a complete disclosure and description of how to perform the methods and use the compositions disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an" and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Perceived color quality of inkjet inks can be characterized using any one of several color space systems, such as Munsell or CIELAB, as is well known in the art. The CIELAB color space system is based upon standards promulgated by the International Committee on Illumination or CIE (Commission Internationale de' L'Eclairage) in 1976. With respect to the Munsell color space, a given color is defined using three terms, namely Hue (H), Value (V), and Chroma (C). With respect to the CIELAB color space, a color is defined using three terms L*, a*, and b*. With the CIELAB system, L* defines the lightness of a color and ranges from 0 (black) to 100 (white). In addition, the terms a* and b* may be used to define the hue and chroma of a color, where a* ranges from a negative number (green) to a positive number (red) and b* ranges from a negative number (blue) to a positive number (yellow). The additional terms of h° (hue angle) and C* (chroma) are also used to further describe a given color, as is known to those skilled in the art.

"Lightness," as the term is used herein, refers to the L* value measured in CIELAB color space. For example, in the CIELAB color space (which allows the specification of color perceptions in terms of a three-dimensional space), the lightness, expressed as L*, extends from zero (black) to 100 (white)

For gray inks it is desirable to have low chroma i.e. small values of a* and b*, to ensure good neutrality. Where chroma, c*, is related to a* and b* by the relationship: $(c^*)^2=(a^*)^2+(b^*)^2$. In practice, the preferred c*, a* and b* for a gray ink are determined by measuring the a* and b* values on the print medium to be used and adjusting the neutrality of the gray ink using blending colorants.

"Metamerism" is the variation in visual response to color under varying illuminants resulting from the non-flat spectral reflectance produced by gray inks. For gray inks, little or no metamerism is desired, to reduce undesirable color shifts when an image is viewed under different illuminants. Metamerism is determined by measuring the change in CIELAB color coordinates ($\Delta E$) when an image is viewed under different light sources, where $(\Delta E)^2=(\Delta a^*)^2+(\Delta b^*)^2+(\Delta L^*)^2$. Typical illuminates include D50, D65, and F11. In the present disclosure, metamerism was scored on a scale of 1 to 3 where a score of 1 corresponded to poor metamerism ($\Delta E>5$), a score of 2 would mean fairly acceptable ($\Delta E$ 3-5), and a score of 3 would indicate little or no metamerism ($\Delta E<3$).

Light fastness is defined based on nominal light exposure behind glass before a failure condition (loss in optical density and/or change in hue) is reached. Nominal light exposure is 450 lux per 12 h day. The failure conditions used are 25% optical density loss or change in hue with time starting with an optical density of 0.35 for light gray inks or 0.6 for medium gray inks. The light fade is scored on a scale of 1 to 4 where a score of 1 would mean 0-20 yrs of light resistance, a score of 2 would mean 21-40 yrs of light resistance, a score of 3 would mean 41-60 yrs of light resistance, and a score of 4 would mean >60 yrs of light resistance.

Ozone fade testing is carried out in a Hampton 903 ozone chamber at a temperature of 25° C., 50% relative humidity and with an ozone concentration of 1 ppm until a failure condition (loss in optical density and/or change in hue) is reached. The failure conditions used is 25% optical density loss or an unacceptable change in hue with time for the gray color patch, starting with an optical density of 0.35 or 0.6. The ozone fade is scored on a scale of 1 to 4 where a score of 1 would mean <1 yr of ozone resistance, a score of 2 would mean 1-3 yrs of ozone resistance, a score of 3 would mean 3-6 yrs of ozone resistance and a score of 4 would mean >6 yrs of ozone resistance.

Humidity resistance is determined by measuring the change in CIELAB color coordinates ($\Delta E$) when an image is stored for two days at high temperature and high humidity, i.e., 30° C. and 80% relative humidity. Humidity resistance was scored on a scale of 1 to 3 where a score of 1 would mean poor humidity resistance ($\Delta E>5$), a score of 2 would mean moderate humidity resistant ($\Delta E$ 3-5), and a score of 3 would indicate good humidity resistance ($\Delta E<3$).

Discussion

Dye-based gray ink formulations and ink-jet ink sets including the dye-based gray ink formulation are described. The dye-based gray ink formulations include combinations of yellow, magenta, blue/cyan dyes in ratios that produce neutral colors. In an embodiment, the dye-based gray ink formulations of the present disclosure do not include black dyes. The method for making dye-based gray ink formulations produces gray inks of varying lightness levels (e.g., L* of about 10 to 90) that are neutral over a wide media range (e.g., office paper, all-in-one paper, photo paper, semi-gloss paper, HP Office Paper, HP All-In-One Paper, HP Advanced Photo Paper, HP Everyday Photo Paper, semi-gloss, and transparencies), have permanence over long periods of times, show little metamerism, and are waterfast and humidity resistant.

The dye-based gray ink formulation can be printed using an ink dispensing system that includes, but is not limited to, ink-jet technologies and coating technologies, which dispense the ink onto the print medium. Ink-jet technology, such as drop-on-demand and continuous flow ink-jet technologies can be used to dispense the ink. The ink dispensing system can include at least one ink-jet printhead system (e.g., thermal ink-jet printhead and/or a piezo ink-jet print head) operative to dispense (e.g., jet) the inks through one or more of a plurality of nozzles in a printhead. The printhead system incorporates an array of firing chambers that receive the ink dissolved or dispersed in a liquid vehicle, which are in fluid communication with one or more ink reservoirs.

In an embodiment, the dye-based gray ink formulation can be included in a 5-ink ink-jet set including a black ink, a cyan ink, magenta ink, and yellow ink, where the dye-based gray ink formulation is the fifth ink of the set. In another embodiment, the dye-based gray ink formulation can be included in a 7-ink ink-jet set including a black ink, cyan ink, magenta ink, yellow ink, light cyan ink, light magenta ink, where the dye-based gray ink formulation is the seventh ink of the set. In another embodiment, two or more dye-based gray ink formulations (e.g., light gray ink, medium gray ink, and dark gray ink) can be included in any of the ink ink-jet sets described above. In yet another embodiment, gray inks can be combined with black ink for use in monochrome printers.

The term "print media" or "print medium" can include, but are not limited to, a paper substrate, a photobase substrate, a plastic media (e.g., clear to opaque plastic film) substrate, and the like. In particular, print media can include, but is not limited to, office paper, all-in-one paper, photo paper, semi-gloss paper, HP Office Paper, HP All-In-One Paper, HP Advanced Photo Paper, HP Everyday Photo Paper, semi-gloss, and transparencies. The print media may include, but is not limited to, a hard or flexible material made from a polymer, a paper, a glass, a ceramic, a woven cloth, or a non-woven cloth material. In an embodiment, the print media is a porous media.

The dye-based gray ink formulation includes a yellow dye, a magenta dye, and a cyan or blue dye. In addition, the dye-based gray ink formulation includes, but is not limited to, solvents, salts, buffers, biocides, binders, an aqueous solution, and combinations thereof. In an embodiment, the dye-based gray ink formulation does not include a black dye.

Neutral gray inks can be made with these dyes that range from very light gray (high L*) to dark gray (low L*) and all levels in between. The lightness level of a gray ink can be changed by print density or by the amount or concentration of dyes in the inks. The printing application will determine the desired lightness level. For example a light gray, L*~70, can be made by printing a low density of a dark gray ink, or printing a high density of a light gray ink. Using the dark gray ink will require less ink to achieve L*~70, however it will result in more grain, or visible ink drops on the print sample. Embodiments of the present disclosure provide for neutral gray inks that have L* range from about 10 to 90 or about 17 to 90. An embodiment of the dye-based gray ink formulation includes a combination of yellow dye, magenta dye, and cyan dye to provide a dye-based gray ink formulation having a L* from about 10 to 80 (dark gray), about 36 to 85 (medium gray), and about 65 to 90 (light gray). In another embodiment of the dye-based gray ink formulation includes a combination of yellow dye, magenta dye, and cyan dye to provide a dye-based gray ink formulations having a L* from about 10 to 18 (dark gray), or about 30 to 47 (medium gray), or about 54 to 72 (light gray) when printed at the maximum (or darkest) print density. In another embodiment of the dye-based gray ink formulation includes a combination of yellow dye, magenta dye, and blue dye to provide a light gray ink formulation having L* from about 65 to 90 and a medium gray with L* 36 to 85. Specific embodiments are described in the Examples in Tables 2 to 4 in FIGS. 5 through 9.

Embodiments of the present disclosure provide for neutral gray inks that have a low metamerism. An embodiment of the dye-based gray ink formulation includes a combination of yellow dye, magenta dye, and cyan dye (or blue dye) having a ΔE less than 3. It should be noted that the ΔE depends in part upon the paper and light source used. Specific embodiments are described in the Examples in Tables 2 to 4 in FIGS. 5 through 9.

Embodiments of the present disclosure provide for neutral gray inks that have good neutrality, which is defined as having a low c* and a* and b* values that closely match the a* and b* values of the print medium. By varying the fraction of dyes used in the gray inks, the a* and b* value of the print medium can be matched. An embodiment of the dye-based gray ink formulation includes a combination of yellow dye, magenta dye, and cyan dye (or blue dye) having a c* about 1.80 to 8.8 and about 3.2 to 8.8. Specific embodiments are described, in the Examples in Tables 1 to 3 in FIGS. 5 through 9. In these examples, gray inks are described that are neutral on HP Advanced Photo paper. It should be noted that embodiments of the dye-based gray ink formulation that includes a combination of yellow dye, magenta dye, and cyan dye (or blue dye) can have different a*, b*, and/or c* based on the type of paper.

Embodiments of the present disclosure provide for neutral gray inks that are prepared by blending cyan (or blue) dyes with magenta and yellow dyes. In these blends, the fraction of each of cyan dye (or blue dye), magenta dye, and yellow dye, can range from about 0.1 to 0.8 and the combined fractions of each dye adds up to 1.0. In particular, embodiments of the present disclosure provide for neutral gray inks that have about 0.30 to 0.39 fraction of cyan dye (or blue dye), about 0.26 to 0.32 fraction of magenta dye, and about 0.33 to 0.38 fraction of yellow dye. Within these ranges, gray inks can be made that satisfy neutrality and darkness requirements on a print medium.

The yellow dye can include, but is not limited to, compounds defined by structure A shown in FIG. 1. R represents hydrogen or alkyl having from 1 to 6 carbon atoms. M represents hydrogen or a metal atom or ammonium optionally substituted by alkyl, alkoxyalkyl or hydroxyalkyl. $R_{17}$, $R_{18}$ independently represent hydrogen, alkyl or alkoxy each having from 1 to 3 carbon atoms. $p_4$ is from 1 to 3 and the sulfo group is in position 1, 4, 5, 6, 7 or 8 in the case where $p_4$ is equal to 1; the sulfo groups are in positions 4 and 8, 5 and 7, 6 and 8 or 1 and 5 in the case where $p_4$ is equal to 2; or the sulfo groups are in positions 3, 6 and 8 or 4, 6 and 8 in the case where $p_4$ is equal to 3. Subscripts n, m are each independently from 2 to 6.

In particular, the yellow dye can include, but is not limited to, 1,5-Naphthalenedisulfonic acid, 3-[[4-[[4,6-bis[(3-sulfopropyl)thio]-1,3,5-triazin-2-yl]amino]-5-methoxy-2-methylphenyl]azo]-, tetrasodium salt (Yellow dye #1); 1,3-Naphthalenedisulfonic acid, 7-[[4-[[4,6-bis[(3-sulfopropyl)thio]- 1,3,5-triazin-2-yl]amino]-3-methoxyphenyl]azo]-, tetrasodium salt (Yellow dye #2), Other Yellow dyes that can be used include, benzenesulfonic acid, 2,5-dichloro-4-[4,5-dihydro-3-methyl-5-oxo-4-[(4-sulfophenyl)azo]-1H-pyrazol-1-yl]-, disodium salt (Acid Yellow 17-Na), 1H-Pyrazole-3-carboxylic acid, 4,5-dihydro-5-oxo-1-(4-sulfophenyl)-4-[(4-sulfophenyl)azo], trisodium salt (Acid Yellow 23), 1,5-Naphthalenedisulfonic acid, 3,3'-[[6-[(2-hydroxyethyl)amino]-1,3,5-triazine-2,4-diyl]bis[imino(2-methyl-4,1-phenylene)-2,1-diazenediyl]]bis-, sodium salt (1:4) or TMA salt (Direct Yellow 86), and combinations thereof.

Figure 2:
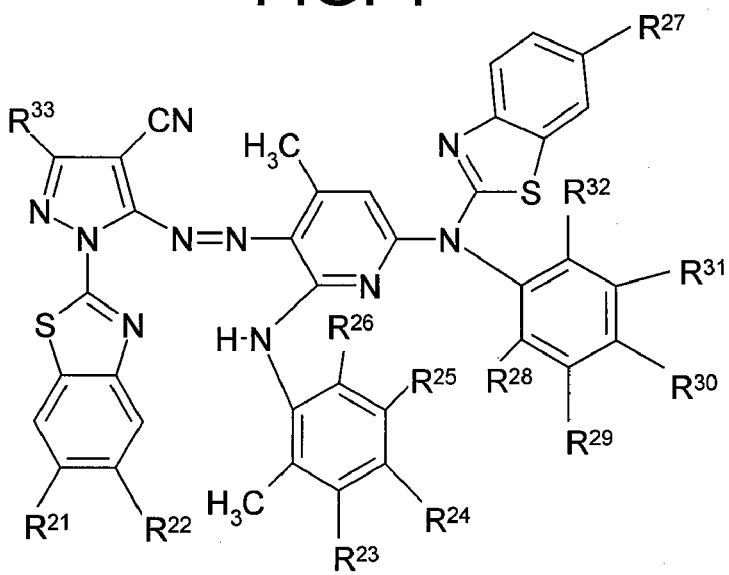
FIG. 2 illustrates an illustrative embodiment of magenta dyes defined by structure B.

The magenta dye can include, but is not limited to, compounds defined by structure B shown in FIG. 2. $R^{21}$, $R^{23}$, $R^{25}$, $R^{27}$, $R^{29}$, and $R^{31}$, are independently a hydrogen atom or a sulfonate group. $R^{22}$ is a hydrogen atom or a nitro group. $R^{26}$ and $R^{28}$ are independently a hydrogen atom or a methyl group. $R^{24}$ and $R^{30}$ are independently a methyl or sulfonate group. $R^{32}$ is a methyl or a methoxy group. In one embodiment, in structure B, $R^{21}$, $R^{23}$, $R^{27}$, and $R^{31}$ can be sulfonate groups; $R^{22}$, $R^{25}$, and $R^{29}$ can be hydrogen atoms; and $R^{24}$, $R^{26}$, $R^{28}$, $R^{30}$, and $R^{32}$ can be methyl groups. $R^{33}$ is a hydrogen atom, a sulfur atom, a methyl group, an ethyl group, a n-propyl group, an isopropyl group, a t-butyl group, a n-butyl group, and an isobutyl group. In another embodiment, the sulfonate group can be a salt of lithium, sodium, potassium, ammonium, tetramethylammonium, or a mixture thereof. In still another embodiment, the sulfonate group can be a salt of potassium, methyl, ethyl, n-propyl, i-propyl, n-butyl, i-butyl, t-butyl In particular, the magenta dye can include, but is not limited to, 6-Benzothiazolesulfonic acid, 2-[4-cyano-3-(1,1-dimethylethyl)-5-[[4-methyl-6-[(6-sulfo-2 benzothiazolyl) (2,4,6-trimethyl-3-sulfophenyl)amino]-2-[(2,4,6-trimethyl-3-sulfophenyl)amino]-3-pyridinyl]azo]-1H-pyrazol-1-yl] potassium sodium salt (Magenta dye #1), 1,3-Benzenedisulfonic acid, 4-[[2,7-dihydro-3-methyl-2,7-dioxo-1-(3-sulfobenzoyl)-3H-naphtho[1,2,3-de]quinolin-6-yl]amino]-, ammonium salt (1:3) (Experimental Magenta 2), 2,7-Naphthalenedisulfonic acid, 5-(benzoylamino)-4-hydroxy-3-[[1-sulfo-6-[[2-(sulfooxy)ethyl]sulfonyl]-2-naphthalenyl]azo]-, tetrasodium salt (Reactive Red 180-Na), Xanthylium, 3-[(2,6-dimethylphenyl)amino]-6-[(2,6-dimethylsulfophenyl)amino]-9-(2-sulfophenyl)-, inner salt, monosodium salt (Acid Red 289-Na), Xanthylium, 3,6-bis(diethylamino)-9-(2,4-disulfophenyl)-, inner salt, sodium salt (Acid Red 52), 2-Naphthalenesulfonic acid, 6-amino-5-[[4-[[4-[bis(2-hydroxyethyl)amino]-6-[(2-sulfoethyl)amino]-1,3,5-triazin-2-yl]amino]phenyl]azo]-4-hydroxy-, disodium salt (M-377-Na), Nickel, 5-[(2-hydroxy-3,7-disulfo-1-naphthalenyl)azo]-1H-1,2,4-triazole-3-carboxylate sodium complexes (Experimental Magenta 7)), and combinations thereof.

Figure 3:
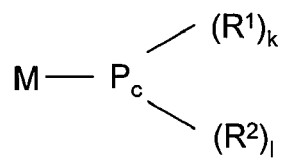
FIG. 3 illustrates an illustrative embodiment of cyan dyes defined by structure C.

The cyan or blue dye can include, but is not limited to, phthalocyanine compounds defined by structure C shown in FIG. 3. M represents a hydrogen atom or a metal atom (or an oxide, hydroxide, or halide thereof). $P_c$ represents a phthalocyanine nucleus. $R^1$ and $R^2$ each independently represent a substituent selected from the group of $—SOX^1$, $—SO_2X^1$, $SO_2NX^2X^3$, $—SO_3X^4$, where $X^1$, $X^2$, $X^3$, and $X^4$ each independently represents a hydrogen atom, a substituted or unsubstituted alkyl group, a substituted or unsubstituted aryl group, or a substituted or unsubstituted heterocyclic group. At least one of $R^1$ or $R^2$ has an ionic hydrophilic group as a substituent. Additionally, k and l each independently represents an integer ranging from 1 to 3. Typically, k and l each independently is selected such that k+l equals 4.

Additionally, $R^1$ can be $—SO—(CH_2)_3—SO_3Z$ or $—SO_2—(CH_2)_3—SO_3Z$; and/or $R^2$ can be $—SO_2—(CH_2)_3—SO_2NH—C_2H_4OC_2H_4OH$ or $—SO_2—(CH_2)_3—SO_2NH—CH_2CH(OH)CH_3$. In these embodiments, Z can be lithium, sodium, potassium, ammonium, tetramethylammonium, or a mixture thereof. In yet another embodiment, Z can be lithium or potassium. In a further embodiment, Z can be lithium. In one specific embodiment (Cyan dye # 1), $R^1$ can be $—SO_2—(CH_2)_3—SO_3Z$, $R^2$ can be $—SO_2—(CH_2)_3—SO_2NH—CH_2CH(OH)CH_3$, k can be 3, and Z can be lithium.

Table I in FIG. 5 provides exemplary phthalocyanine dyes in accordance with embodiments of the present disclosure, where the substituents $R^1$ and $R^2$ is each introduced at the β-position. However, it should be appreciated by those skilled in the art, that although the preferred dye has the R substituent at the β-position, the dye and the ink containing the same can further include the same basic nucleus with the R substituent at different positions such as the α-position. In the exemplary dyes shown in Table I in FIG. 5, M is copper (Cu).

In particular, the cyan or blue dye can include, but is not limited to, Cyan dye # 1 as described above, Copper, [29H,31H-phthalocyaninato (2-)-kN29, kN30, kN31, kN32]-, aminosulfonyl [(2-hydroxyethyl)amino]sulfonyl sulfo derivs., ammonium sodium salts (Experimental Cyan 17i), Copper, [29H,31H-phthalocyaninato(2-)-xN29,xN30,xN31,xN32]-, aminosulfonyl[(2-hydroxyethyl)amino]sulfonyl sulfo derivs, sodium salts (Cyan 485).

Figure 4:
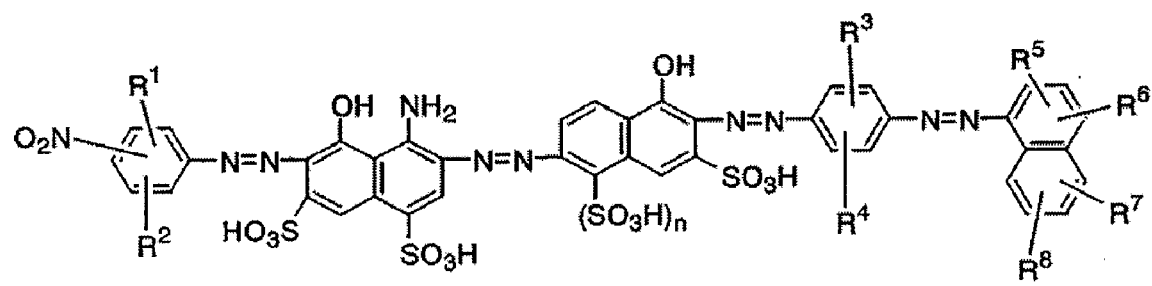
FIG. 4 illustrates an illustrative embodiment of blue dyes defined by structure D.

In another embodiment, blue dyes of the structure D shown in FIG. 4 can be used. R1 and R2 each independently represents a hydrogen, a halogen, a cyano group, a carboxy group, a sulfo group, a sulfamoyl group, a N-alkylaminosulfonyl group, or a N-phenylaminosulfonyl group. R3, R4, R5, R6, R7, and R8 each independently represents a hydrogen, a halogen group, a hydroxy group, a cyano group, a carboxy group, a sulfo group, a sulfamoyl group, a N-alkylaminosulfonyl group, or a N-phenylaminosulfonyl group. Subscript n is 0 or 1 (Blue dye #1).

When the dye-based gray ink formulation is printed on media, in particular porous media, the dye-based gray ink formulation has gray ink neutrality, permanence, low metamerism, and waterfastness. Specific examples of characteristics of embodiments of the present disclosure are provided in the Examples.

As mentioned above, the dye-based gray ink formulation can include solvents, salts, buffers, biocides, binders, an aqueous solution, and combinations thereof, which are described in more detail below.

The solvent can include, but is not limited to, water soluble organic solvents. The water soluble organic solvents can include, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones.

For example, the solvent can include, but is not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides.

In particular, the solvent can include, but is not limited to, ethoxylated glycerol, 2-methyl-1,3-propanediol; 2-methyl-2,4-pentanediol; 1,5-pentanediol; 2-pyrrolidone; 1-(2-hydroxyethyl)-2-pyrrolidinone; 2-ethyl-2-hydroxymethyl-1,3-propanediol; diethylene glycol; 3-methoxybutanol; and 1,3-dimethyl-2-imidazolidinone. The solvent can also include, but is not limited to, 1,2-hexanediol; 1,2-octanediol; 2,5-dimethyl-3-hexyne-2,5-diol; trimethylol propane, 3-hexnye-2,5-diol; sulfolane; 3-pyridyl carbinol; and other pyrridine derivatives. In addition, the solvents can be added to reduce the rate of evaporation of water in the ink-jet to minimize clogging or other properties of the ink such as viscosity, pH, surface tension, optical density, and print quality. The solvent can be about 5 to 25 weight % of the dye-based gray ink formulation.

The salt can include, but is not limited to, ammonium, potassium, or lithium benzoate salts; ammonium, potassium, or lithium acetates; lithium, potassium, or lithium xylene sulfonate salts; nitrates of $NH_4$, sodium, lithium, and potassium; lactates of ammonium, potassium, or lithium; citrates of ammonium, potassium, or lithium; carbonates of sodium, lithium, and potassium; diphosphates of sodium, lithium, and potassium; triphosphates of sodium, lithium, and potassium; and mixtures thereof. In addition, the salt can include sodium, lithium, and potassium salts of compounds such as, but not limited to, citrate, succinate, lactate, formate, gluconate, tartarate, malonate, fumarate, malate, sebacate, laurate, glutarate, acetate, oxylate, adipicate, pimelicate, subericate, azelaicate, and mixtures thereof. The salt can be about 1 to 6 weight % of the dye-based gray ink formulation.

Various buffers or pH adjusting agents can also be optionally used in the ink formulation. The buffering agent can include, but are not limited to, hydroxides of alkali metals and amines (e.g., lithium hydroxide, sodium hydroxide, potassium hydroxide, and citric acid); amines (e.g., triethanolamine, diethanolamine, and dimethylethanolamine); hydrochloric acid; and other basic or acidic components which do not substantially interfere with the bleed control or optical density characteristics. In addition, commercially available pH buffers can also be used and are available from Sigma Aldrich (e.g., MES, MOPs, Trizma, Bis-Tris, MOPSO, TES, TAPSO, TEA, TRICINE, BICINE, TAPS, and AMPSO, in the acid or salt form). The buffers can be about 0.1 to 3 weight % of the dye-based gray ink formulation.

Various biocides can be used to inhibit growth of undesirable microorganisms. The biocides can include, but are not limited to, benzoate salts, sorbate salts, commercial products such as NUOSEPT™ (Huls America), UCARCIDE™ (Union Carbide), VANCIDE™ (RT Vanderbilt Co.), and PROXEL™ (ICI Americas), and other biocides. The biocides can be about 0.1 to 3 weight % of the dye-based gray ink formulation.

Various surfactants can be used in the ink formulation. The surfactant can include, but are not limited to, anionic, nonionic, and zwitterionic surfactants. The anionic surfactant can include, but is not limited to, sodium or potassium salts of straight chain fatty acids; sodium and potassium salts of coconut oil fatty acids; sodium and potassium salts of tall oil fatty acids; amine salts; acylated polypeptides; linear alkyl benzene sulfonates; higher alkyl benzene sulfonates; benzene; toulene; xylene; cumenesulfonate; lignosulfonates; petroleum sulfonates; N-acyl-n-alkyltaurates; paraffin sulfonates; secondary n-alkanesulfonates; alpha olefin sulfonates; sulfosuccnic esters; alkyl naphalene sulfonates; isethionates; sulfuric acid ester salts; sulfated polyoxyethylenated straight-chain alcohols; sulfated triglycerides oils; phosphoric and polyphosphoric acid esters; and perfluorinated anionic surfactants.

The non-ionic surfactant can include, but is not limited to, alkylphenol ethoxylates, polyoxyethylenates, straight chain alcohols ethoxylates, polyoxyethylenated polyoxypropylene glycols, polyoxyethylenated mercaptans, long chain carboxylic acid esters, glyceryl and polyglyceryl esters of natural and fatty acids, propylene glycol, sorbitol and polyoxyethylenated sorbitol esters, polyoxyethylene glycol esters and polyoxyethylenated fatty acids, aklanolamine condensates, alkanolamides, tertiary acetylenic glycols, polyoxyethylenated silicones, N-alkylprrrolidones, and alkylpolyglycosides.

The zwitterionic surfactant can include, but is not limited to, beta-N-alkylaminopropionic acids, N-alkyl-beta-iminodipropionic acids, imidazoline carboxylates, N-alkylbetaines, amine oxides, sulfobetaines and sultaines surfactants. The surfactant can be about 0.05 to 3.0 weight % of the dye-based gray ink formulation.

As mentioned above, the dye-based gray ink formulation can be used in monochrome printers or in conjunction with one or more color inks in an ink-jet ink set (e.g., 5-ink printing system, 7-ink printing system, and the like). The ink formulation and the one or more color inks can be used in the same printhead or in one or more printheads. Specific inks are known in the art.

EXAMPLES

Now having described the embodiments of the present disclosure, in general, the following Examples describe some additional embodiments of the present disclosure. While embodiments of present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1

Examples of gray inks that can be formulated according to this embodiment were prepared using cyan dye #1, blue dye # 1, Yellow dyes #1 and # 2 and magenta dye #1. Table 2a, shown in FIG. 6, describes different blends of dyes used to make gray inks. Each example 1-9 includes the wt % of the dyes noted in Table 2a, with the remaining wt % being the vehicle described in Table 2b. Table 2b, shown in FIG. 7, describes the aqueous ink formulation that was used for each of Example dye blends 1-9. Comparative examples (CE1 and CE2) are light gray and medium gray inks from a Hewlett Packard # 100 inkjet cartridges. The examples represent specific gray inks that can be made using this disclosure, but it should be noted that lighter or darker gray inks can also be prepared in a similar manner by blends of the dyes described herein.

Table 3, as shown in FIG. 8, gives neutrality (a* b* c*) and L* information measured at D65 illumination conditions when the inks described by Tables 2a and 2b were printed on HP Advanced Photopaper using an HP Deskjet 6540 printer. The L* range represents a typical range that can be achieved by the example inks when a gray ramp is printed with different print densities. The a*, b*, and c* values are shown for the darkest print density (minimum L*) in the gray ramp. The a* b* c* values for the print medium prior to printing is shown at the bottom of Table 3. The example inks demonstrate an adequate match to the neutrality of the print medium can be achieved by embodiments of this disclosure. Table 4, as shown in FIG. 9, has lightfastness, ozonefastness, humidity resistance, and metamerism results for the inks shown in Table 2 relative to comparative examples. The comparative examples do not have good ozonefastness or humidity resistance and these results are included in Table 4 in FIG. 8.

Cyan dye # 1 is given by Structure C, where M represents a copper atom; $P_c$ represents a phthalocyanine nucleus. $R^1$ is represented by $—SO_2—(CH_2)_3—SO_3Li$, and $R^2$ is represented by $—SO_2—(CH_2)_3—SO_2NH—CH_2CH(OH)CH_3$, and where k is 3, and l is 1 . . . Blue dye # 1 is a dye of structure D. Magenta # 1 is 6-Benzothiazolesulfonic acid, 2-[4-cyano-3-(1,1-dimethylethyl)-5-[[4-methyl-6-[(6-sulfo-2 benzothiazolyl)(2,4,6-trimethyl-3-sulfophenyl)amino]-2-[(2,4,6-trimethyl-3-sulfophenyl)amino]-3-pyridinyl]azo]-1H-pyrazol-1-yl] potassium sodium salt Yellow dye # 1 is 1,5-Naphthalenedisulfonic acid, 3-[[4-[[4,6-bis[(3-sulfopropyl) thio]-1,3,5-triazin-2-yl]amino]-5-methoxy-2-methylphenyl] azo]-, tetrasodium salt. Yellow dye # 2 is 1,3-Naphthalenedisulfonic acid, 7-[[4-[[4,6-bis[(3-sulfopropyl) thio]-1,3,5-triazin-2-yl]amino]-3-methoxyphenyl]azo]-, tetrasodium salt It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'". The term "consisting essentially of" is defined to include a formulation that includes the inks or dyes specifically mentioned as well as other components (e.g., solvents, salts, buffers, biocides, binders, an aqueous solution) using in an ink formulation, while not including other dyes or inks not specifically mentioned in the formulation.

Many variations and modifications may be made to the above-described embodiments. All such modifications and variations are intended to be included herein within the scope of this disclosure and protected by the following claims.

At least the following is claimed:

1. A dye-based gray ink formulation, comprising:
a yellow dye, a magenta dye, and a cyan dye, wherein dye-based gray ink formulation has a L* of about 10 to 90 and a c*<10, and wherein the dye-based gray ink formulation does not include a black dye.

2. The dye-based gray ink formulation of claim 1, wherein L* is about 17 to 90 and c*<10.

3. The dye-based gray ink formulation of claim 1, wherein L* is about 30 to 90 and a c*<10.

4. The dye-based gray ink formulation of claim 1, wherein L* is about 54 to 90 and a c*<10.

5. The dye-based gray ink formulation of claim 1, wherein the yellow dye includes compounds defined by structure A:

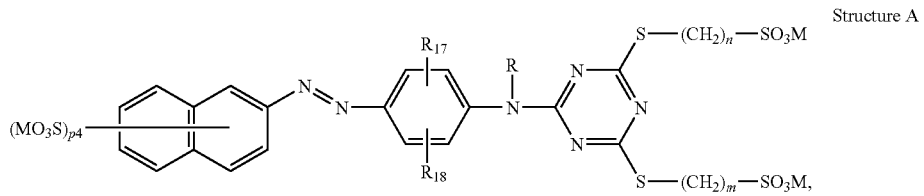

Structure A wherein R is hydrogen or an alkyl having from 1 to 6 carbon atoms; M is hydrogen, a metal atom or ammonium optionally substituted by alkyl, alkoxyalkyl or hydroxyalkyl; $R_{17}$ and $R_{18}$ are independently hydrogen, alkyl or alkoxy each having from 1 to 3 carbon atoms; $p_4$ is from 1 to 3 and the sulfo group is in position 1, 4, 5, 6, 7 or 8 in the case where $p_4$ is equal to 1; the sulfo groups are in positions 4 and 8, 5 and 7, 6 and 8 or 1 and 5 in the case where $p_4$ is equal to 2; or the sulfo groups are in positions 3, 6 and 8 or 4, 6 and 8 in the case where $p_4$ is equal to 3; and subscripts n and m are each independently from 2 to 6.

6. The dye-based gray ink formulation of claim 5, wherein the magenta dye includes compounds defined by structure B:

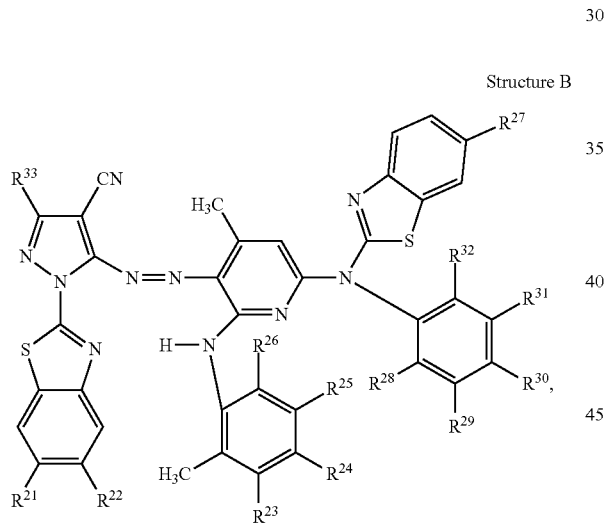

Structure B wherein $R^{21}$, $R^{23}$, $R^{25}$, $R^{27}$, $R^{29}$, and $R^{31}$ are independently a hydrogen atom or a sulfonate group; $R^{22}$ is a hydrogen atom or a nitro group; $R^{26}$ and $R^{28}$ are independently a hydrogen atom or a methyl group; $R^{24}$ and $R^{30}$ are independently a methyl or sulfonate group; $R^{32}$ is a methyl or a methoxy group; and $R^{33}$ is a hydrogen atom, a sulfur atom, a methyl group, an ethyl group, a n-propyl group, an isopropyl group, a t-butyl group, a n-butyl group, or an isobutyl group.

7. The dye-based gray ink formulation of claim 5, wherein the cyan dye includes compounds defined by structure C:

Structure C wherein M is a hydrogen atom, a metal atom, a metal oxide, a metal hydroxide, or a metal halide; $P_c$ is a phthalocyanine nucleus; $R^1$ and $R^2$ are each independently —$SOX^1$, —$SO_2X^1$, $SO_2NX^2X^3$, —$SO_3X^4$, wherein $X^1$, $X^2$, $X^3$, and $X^4$ are each independently a hydrogen atom, a substituted or unsubstituted alkyl group, a substituted or unsubstituted aryl group, or a substituted or unsubstituted heterocyclic group; at least one of $R^1$ or $R^2$ has an ionic hydrophilic group; and wherein k and l are each independently an integer ranging from 1 to 3.

8. The dye-based gray ink formulation of claim 5, wherein the cyan dye is a blue dye that includes compounds defined by structure D:

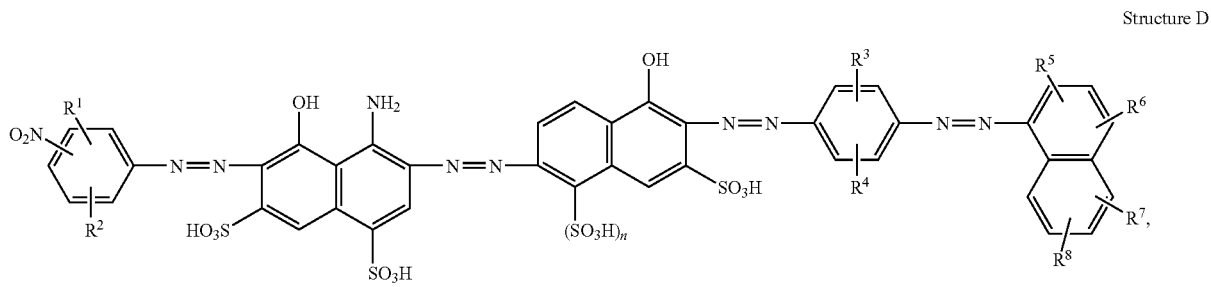

Structure D wherein $R^1$ and $R^2$ are each independently a hydrogen, a halogen, a cyano group, a carboxy group, a sulfo group, a sulfamoyl group, a N-alkylaminosulfonyl group, or a N-phenylaminosulfonyl group; and $R^3$, $R^4$, $R^5$, $R^6$, $R^7$, and $R^8$ are each independently a hydrogen, a halogen group, a hydroxy group, a cyano group, a carboxy group, a sulfo group, a sulfamoyl group, a N-alkylaminosulfonyl group, or a N-phenylaminosulfonyl group.

9. The dye-based gray ink formulation of claim 1, wherein the magenta dye includes compounds defined by structure B:

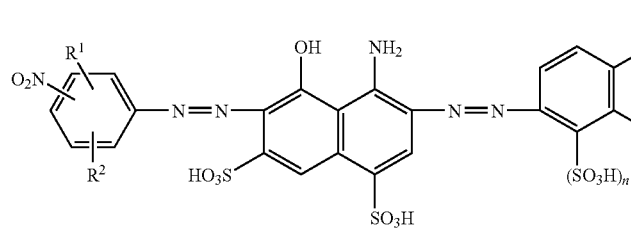

Structure B

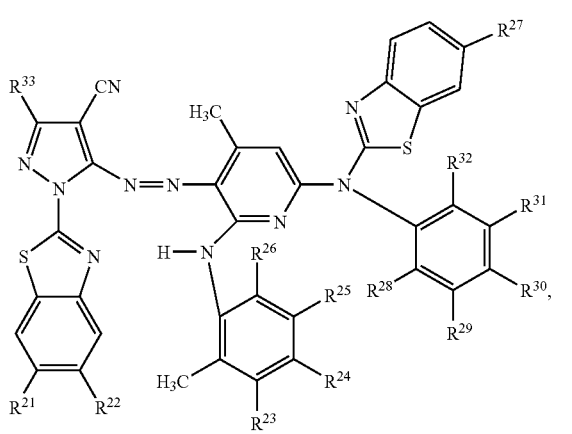

wherein $R^{21}$, $R^{23}$, $R^{25}$, $R^{27}$, $R^{29}$, and $R^{31}$ are independently a hydrogen atom or a sulfonate group; $R^{22}$ is a hydrogen atom or a nitro group; $R^{26}$ and $R^{28}$ are independently a hydrogen atom or a methyl group; $R^{24}$ and $R^{30}$ are independently a methyl or sulfonate group; $R^{32}$ is a methyl or a methoxy group; and $R^{33}$ is a hydrogen atom, a sulfur atom, a methyl group, an ethyl group, a n-propyl group, an isopropyl group, a t-butyl group, a n-butyl group, or an isobutyl group.

10. The dye-based gray ink formulation of claim 9, wherein the cyan dye includes compounds defined by structure C:

Structure C

wherein M is a hydrogen atom, a metal atom, a metal oxide, a metal hydroxide, or a metal halide; $P_c$ is a phthalocyanine nucleus; $R^1$ and $R^2$ are each independently —$SOX^1$, —$SO_2X^1$, $SO_2NX^2X^3$, or —$SO_3X^4$, wherein $X^1$, $X^2$, $X^3$, and $X^4$ are each independently a hydrogen atom, a substituted or unsubstituted alkyl group, a substituted or unsubstituted aryl group, or a substituted or unsubstituted heterocyclic group; at least one of $R^1$ or $R^2$ has an ionic hydrophilic group; and k and l are each independently an integer ranging from 1 to 3.

11. The dye-based gray ink formulation of claim 9, wherein the cyan dye is a blue dye that includes compounds defined by structure D:

Structure D

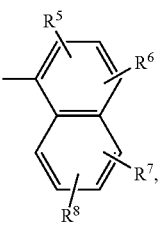

wherein $R^1$ and $R^2$ are each independently a hydrogen, a halogen, a cyano group, a carboxy group, a sulfo group, a sulfamoyl group, a N-alkylaminosulfonyl group, or a N-phenylaminosulfonyl group; and $nR^3$, $R^4$, $R^5$, $R^6$, $R^7$, and $R^8$ are each independently a hydrogen, a halogen group, a hydroxy group, a cyano group, a carboxy group, a sulfo group, a sulfamoyl group, a N-alkylaminosulfonyl group, or a N-phenylaminosulfonyl group.

12. The dye-based gray ink formulation of claim 1, wherein the cyan dye includes compounds defined by structure C:

Structure C

wherein M is a hydrogen atom, a metal atom, a metal oxide, a metal hydroxide, or a metal halide; $P_c$ is a phthalocyanine nucleus; $R^1$ and $R^2$ are each independently —$SOX^1$, —$SO_2X^1$, $SO_2NX^2X^3$, or —$SO_3X^4$, wherein $X^1$, $X^2$, $X^3$, and $X^4$ are each independently a hydrogen atom, a substituted or unsubstituted alkyl group, a substituted or unsubstituted aryl group, or a substituted or unsubstituted heterocyclic group; wherein at least one of $R^1$ or $R^2$ has an ionic hydrophilic group; and k and l are each independently an integer ranging from 1 to 3.

13. The dye-based gray ink formulation of claim 12, wherein the cyan dye is a blue dye that includes compounds defined by structure D:

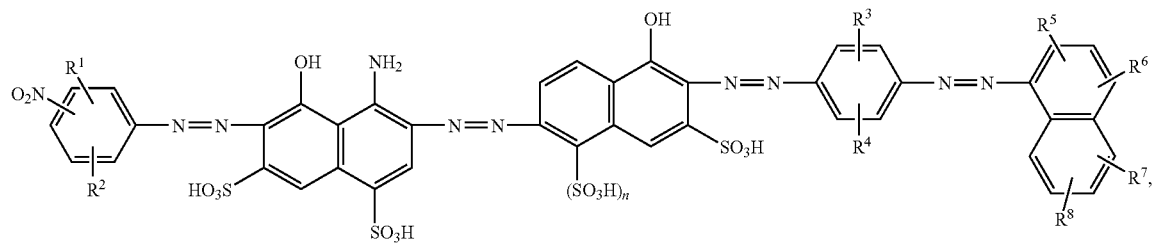

Structure D wherein R¹ and R² are each independently a hydrogen, a halogen, a cyano group, a carboxy group, a sulfo group, a sulfamoyl group, a N-alkylaminosulfonyl group, or a N-phenylaminosulfonyl group; and R³, R⁴, R⁵, R⁶, R⁷, and R⁸ are each independently a hydrogen, a halogen group, a hydroxy group, a cyano group, a carboxy group, a sulfo group, a sulfamoyl group, a N-alkylaminosulfonyl group, or a N-phenylaminosulfonyl group.

14. The dye-based gray ink formulation of claim 1, wherein the cyan dye is a blue dye that includes compounds defined by structure D:

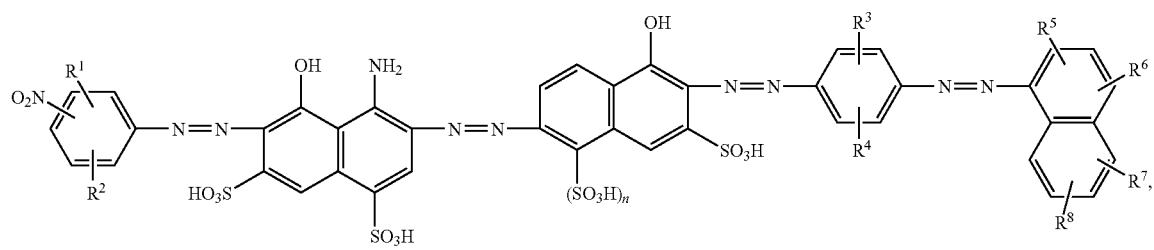

Structure D wherein R¹ and R² are each independently a hydrogen, a halogen, a cyano group, a carboxy group, a sulfo group, a sulfamoyl group, a N-alkylaminosulfonyl group, or a N-phenylaminosulfonyl group; and R³, R⁴, R⁵, R⁶, R⁷, and R⁸ are each independently a hydrogen, a halogen group, a hydroxy group, a cyano group, a carboxy group, a sulfo group, a sulfamoyl group, a N-alkylaminosulfonyl group, or a N-phenylaminosulfonyl group.

15. An ink-jet ink set, comprising:
a plurality of inks, and
dye-based gray ink formulation, comprising: a yellow dye, a magenta dye, and a cyan dye, wherein dye-based gray ink formulation has a L* of about 10 to 90, and wherein the dye-based gray ink formulation does not include a black dye.

16. The ink-jet ink set of claim 15, wherein the yellow dye includes compounds defined by structure A:

Structure A wherein R is hydrogen or an alkyl having from 1 to 6 carbon atoms; M is hydrogen, a metal atom or ammonium optionally substituted by alkyl, alkoxyalkyl or hydroxyalkyl; $R_{17}$ and $R_{18}$ are independently hydrogen, alkyl or alkoxy each having from 1 to 3 carbon atoms; $p_4$ is from 1 to 3 and the sulfo group is in position 1, 4, 5, 6, 7 or 8 in the case where $p_4$ is equal to 1; the sulfo groups are in positions 4 and 8, 5 and 7, 6 and 8 or 1 and 5 in the case where $p_4$ is equal to 2; or the sulfo groups are in positions 3, 6 and 8 or 4, 6 and 8 in the case where $p_4$ is equal to 3; and subscripts n and m are each independently from 2 to 6.

17. The ink-jet ink set of claim 15, wherein the magenta dye includes compounds defined by structure B:

Structure B

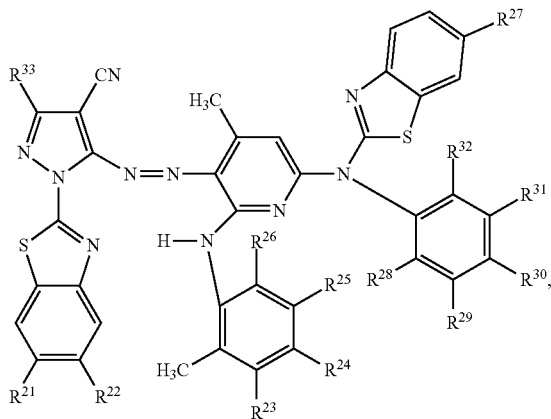

wherein $R^{21}$, $R^{23}$, $R^{25}$, $R^{27}$, $R^{29}$, and $R^{31}$ are independently a hydrogen atom or a sulfonate group; $R^{22}$ is a hydrogen atom or a nitro group; $R^{26}$ and $R^{28}$ are independently a hydrogen atom or a methyl group; $R^{24}$ and $R^{30}$ are independently a methyl or sulfonate group; $R^{32}$ is a methyl or a methoxy group; and $R^{33}$ is a hydrogen atom, a sulfur atom, a methyl group, an ethyl group, a n-propyl group, an isopropyl group, a t-butyl group, a n-butyl group, or an isobutyl group.

18. The ink-jet ink set of claim 15, wherein the cyan dye includes compounds defined by structure C:

Structure C

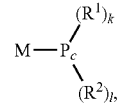

wherein M is a hydrogen atom, a metal atom, a metal oxide, a metal hydroxide, or a metal halide; $P_c$ is a phthalocyanine nucleus; $R^1$ and $R^2$ are each independently $-SOX^1$, $-SO_2X^1$, $SO_2NX^2X^3$, or $-SO_3X^4$, wherein $X^1$, $X^2$, $X^3$, and $X^4$ are each independently a hydrogen atom, a substituted or unsubstituted alkyl group, a substituted or unsubstituted aryl group, or a substituted or unsubstituted heterocyclic group; at least one of $R^1$ or $R^2$ has an ionic hydrophilic group; and k and l are each independently an integer ranging from 1 to 3.

19. The ink-jet ink set of claim 15, wherein the cyan dye is a blue dye that includes compounds defined by structure D:

Structure D

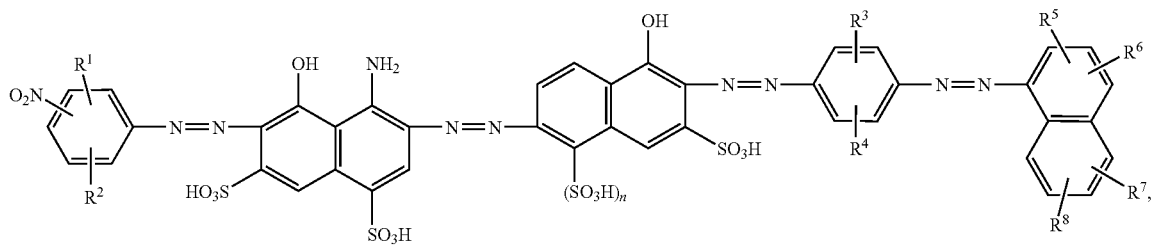

wherein $R^1$ and $R^2$ are each independently a hydrogen, a halogen, a cyano group, a carboxy group, a sulfo group, a sulfamoyl group, a N-alkylaminosulfonyl group, or a N-phenylaminosulfonyl group; and $R^3$, $R^4$, $R^5$, $R^6$, R, and $R^8$ are each independently a hydrogen, a halogen group, a hydroxy group, a cyano group, a carboxy group, a sulfo group, a sulfamoyl group, a N-alkylaminosulfonyl group, or a N-phenylaminosulfonyl group.

20. A method of making a dye-based gray ink formulation, comprising:
mixing at least one dye from each of the following: a yellow dye, a magenta dye, and a cyan dye, wherein a black dye is not used,
wherein the dye-based gray ink formulation has a L* of about 10 to 90 and a c* <10.

21. The method of claim 20, wherein the yellow dye includes compounds defined by structure A:

Structure A

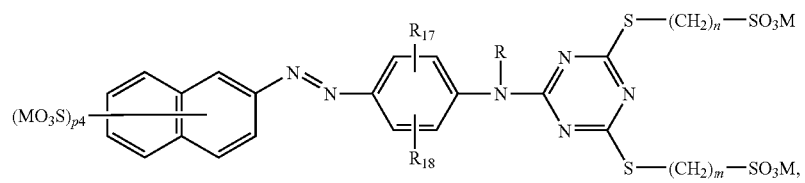

wherein R is hydrogen or an alkyl having from 1 to 6 carbon atoms; M is hydrogen, a metal atom or ammonium optionally substituted by alkyl, alkoxyalkyl or hydroxyalkyl; $R_{17}$ and $R_{18}$ are independently hydrogen, alkyl or alkoxy each having from 1 to 3 carbon atoms; $p_4$ is from 1 to 3 and the sulfo group is in position 1, 4, 5, 6, 7 or 8 in the case where $p_4$ is equal to 1; the sulfo groups are in positions 4 and 8, 5 and 7, 6 and 8 or 1 and 5 in the case where $p_4$ is equal to 2; or the sulfo groups are in positions 3, 6 and 8 or 4, 6 and 8 in the case where $p_4$ is equal to 3; and subscripts n and m are each independently from 2 to 6.

22. The method of claim 21, wherein the magenta dye includes compounds defined by structure B:

Structure B

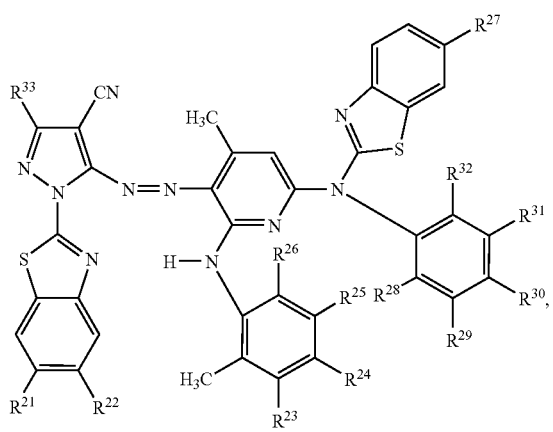

23. The method of claim 21, wherein the cyan dye includes compounds defined by structure C:

Structure C

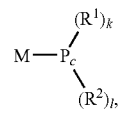

wherein M is a hydrogen atom, a metal atom, a metal oxide, a metal hydroxide, or a metal halide; $P_c$ is a phthalocyanine nucleus; $R^1$ and $R^2$ are each independently —$SOX^1$, —$SO_2X^1$, $SO_2NX^2X^3$, or —$SO_3X^4$, wherein $X^1$, $X^2$, $X^3$, and $X^4$ are each independently a hydrogen atom, a substituted or unsubstituted alkyl group, a substituted or unsubstituted aryl group, or a substituted or unsubstituted heterocyclic group; at least one of $R^1$ or $R^2$ has an ionic hydrophilic group; and k and l are each independently an integer ranging from 1 to 3.

24. The method of claim 21, wherein the cyan dye is a blue dye that includes compounds defined by structure D:

Structure D

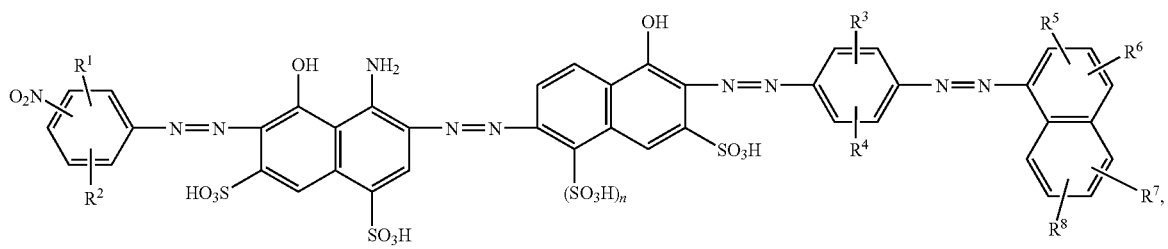

wherein $R^1$ and $R^2$ are each independently a hydrogen, a halogen, a cyano group, a carboxy group, a sulfo group, a sulfamoyl group, a N-alkylaminosulfonyl group, or a N-phenylaminosulfonyl group; and $R^3$, $R^4$, $R^5$, $R^6$, $R^7$, and $R^8$ are each independently a hydrogen, a halogen group, a hydroxy group, a cyano group, a carboxy group, a sulfo group, a sulfamoyl group, a N-alkylaminosulfonyl group, or a N-phenylaminosulfonyl group.

25. A dye-based gray ink formulation, comprising: a yellow dye, a magenta dye, and a cyan dye, wherein the dye-based gray ink formulation has a L* of about 17 to 90 and a c*<10, and wherein the dye-based gray ink formulation does not include a black dye.

26. The dye-based gray ink formulation of claim 25, wherein the yellow dye includes compounds defined by structure A:

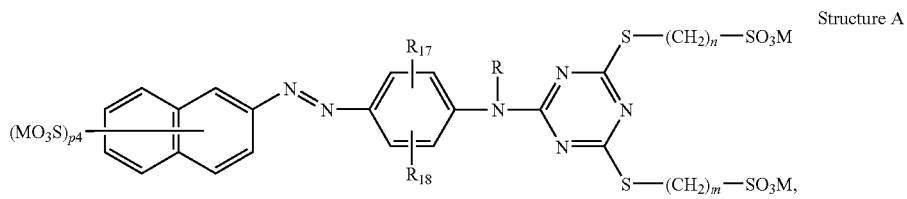

Structure A wherein R is hydrogen or an alkyl having from 1 to 6 carbon atoms; M is hydrogen, a metal atom or ammonium optionally substituted by alkyl, alkoxyalkyl or hydroxyalkyl; $R_{17}$ and $R_{18}$ are independently hydrogen, alkyl or alkoxy each having from 1 to 3 carbon atoms; $p_4$ is from 1 to 3 and the sulfo group is in position 1, 4, 5, 6, 7 or 8 in the case where $p_4$ is equal to 1; the sulfo groups are in positions 4 and 8, 5 and 7, 6 and 8 or 1 and 5 in the case where $p_4$ is equal to 2; or the sulfo groups are in positions 3, 6 and 8 or 4, 6 and 8 in the case where $p_4$ is equal to 3; and subscripts n and m are each independently from 2 to 6.

27. The dye-based gray ink formulation of claim 26, wherein the magenta dye includes compounds defined by structure B:

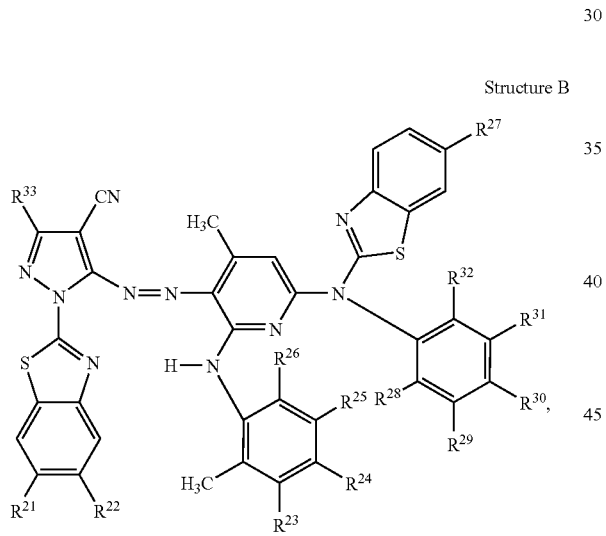

Structure B wherein $R^{21}$, $R^{23}$, $R^{25}$, $R^{27}$, $R^{29}$, and $R^{31}$ are independently a hydrogen atom or a sulfonate group; $R^{22}$ is a hydrogen atom or a nitro group; $R^{26}$ and $R^{28}$ are independently a hydrogen atom or a methyl group; $R^{24}$ and $R^{30}$ are independently a methyl or sulfonate group; $R^{32}$ is a methyl or a methoxy group; and $R^{33}$ is a hydrogen atom, a sulfur atom, a methyl group, an ethyl group, a n-propyl group, an isopropyl group, a t-butyl group, a n-butyl group, or an isobutyl group.

28. The dye-based gray ink formulation of claim 26, wherein the cyan dye includes compounds defined by structure C:

Structure C wherein M is a hydrogen atom, a metal atom, a metal oxide, a metal hydroxide, or a metal halide; $P_c$ is a phthalocyanine nucleus; $R^1$ and $R^2$ are each independently —$SOX^1$, —$SO_2X^1$, $SO_2NX^2X^3$, or —$SO_3X^4$, wherein $X^1$, $X^2$, $X^3$, and $X^4$ are each independently a hydrogen atom, a substituted or unsubstituted alkyl group, a substituted or unsubstituted aryl group, or a substituted or unsubstituted heterocyclic group; at least one of $R^1$ or $R^2$ has an ionic hydrophilic group; and wherein k and l are each independently an integer ranging from 1 to 3.

29. The dye-based gray ink formulation of claim 26, wherein the cyan dye is a blue dye that includes compounds defined by structure D:

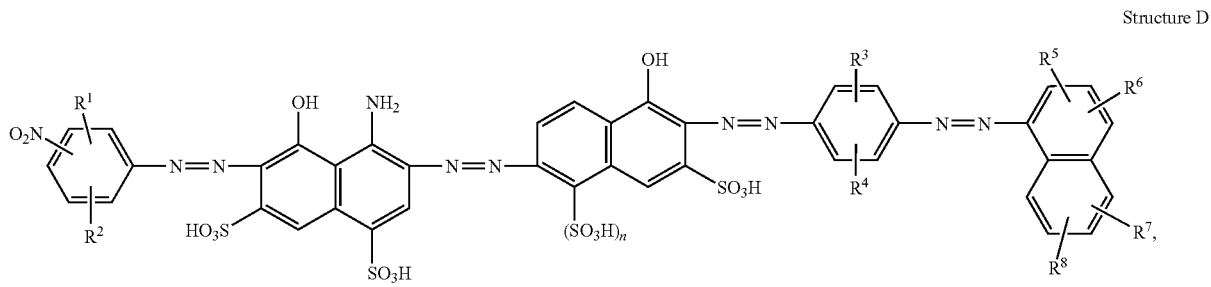

Structure D wherein $R^1$ and $R^2$ are each independently a hydrogen, a halogen, a cyano group, a carboxy group, a sulfo group, a sulfamoyl group, a N-alkylaminosulfonyl group, or a N-phenylaminosulfonyl group; and $R^3$, $R^4$, $R^5$, $R^6$, $R^7$, and $R^8$ are each independently a hydrogen, a halogen group, a hydroxy group, a cyano group, a carboxy group, a sulfo group, a sulfamoyl group, a N-alkylaminosulfonyl group, or a N-phenylaminosulfonyl group.

30. The dye-based gray black ink formulation of claim 25, wherein the magenta dye includes compounds defined by structure B:

Structure B

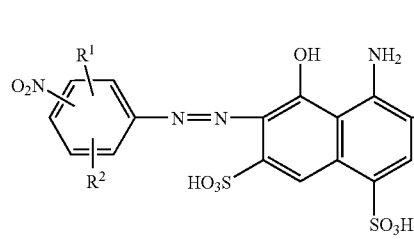

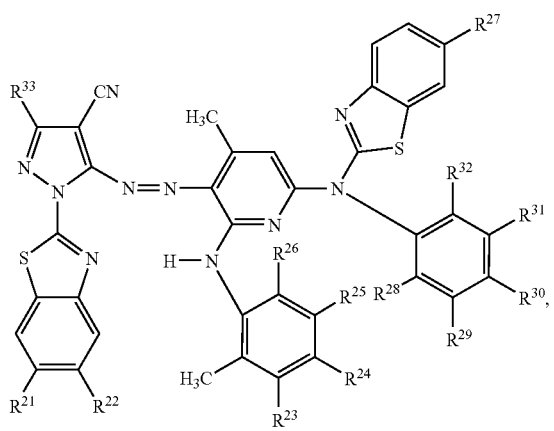

wherein $R^{21}$, $R^{23}$, $R^{25}$, $R^{27}$, $R^{29}$, and $R^{31}$, are independently a hydrogen atom or a sulfonate group; $R^{22}$ is a hydrogen atom or a nitro group; $R^{26}$ and $R^{28}$ are independently a hydrogen atom or a methyl group; $R^{24}$ and $R^{30}$ are independently a methyl or sulfonate group; $R^{32}$ is a methyl or a methoxy group; and $R^{33}$ is a hydrogen atom, a sulfur atom, a methyl group, an ethyl group, a n-propyl group, an isopropyl group, a t-butyl group, a n-butyl group, or an isobutyl group.

31. The dye-based gray ink formulation of claim 30, wherein the cyan dye includes compounds defined by structure C:

Structure C

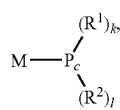

wherein M is a hydrogen atom, a metal atom, a metal oxide, a metal hydroxide, or a metal halide; $P_c$ is a phthalocyanine nucleus; $R^1$ and $R^2$ are each independently —$SOX^1$, —$SO_2X^1$, $SO_2NX^2X^3$, or —$SO_3X^4$, wherein $X^1$, $X^2$, $X^3$, and $X^4$ are each independently a hydrogen atom, a substituted or unsubstituted alkyl group, a substituted or unsubstituted aryl group, or a substituted or unsubstituted heterocyclic group; at least one of $R^1$ or $R^2$ has an ionic hydrophilic group; and k and 1 are each independently an integer ranging from 1 to 3.

32. The dye-based gray ink formulation of claim 30, wherein the cyan dye is a blue dye that includes compounds defined by structure D:

Structure D

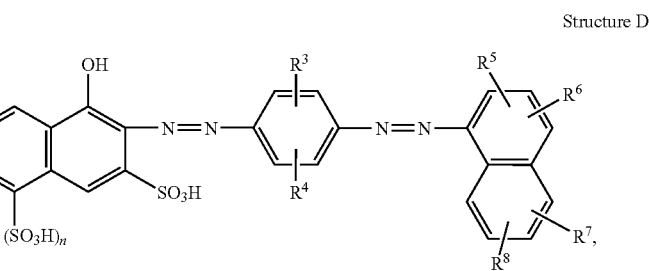

wherein $R^1$, and $R^2$ are each independently a hydrogen, a halogen, a cyano group, a carboxy group, a sulfo group, a sulfamoyl group, a N-alkylaminosulfonyl group, or a N-phenylaminosulfonyl group; and $R^3$, $R^4$, $R^5$, $R^6$, $R^7$, and $R^8$ are each independently a hydrogen, a halogen group, a hydroxy group, a cyano group, a carboxy group, a sulfo group, a sulfamoyl group, a N-alkylaminosulfonyl group, or a N-phenylaminosulfonyl group.

33. The dye-based gray ink formulation of claim 25, wherein the cyan dye includes compounds defined by structure C:

Structure C

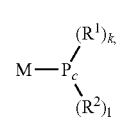

wherein M is a hydrogen atom, a metal atom, a metal oxide, a metal hydroxide, or a metal halide; $P_c$ is a phthalocyanine nucleus; $R^1$ and $R^2$ are each independently —$SOX^1$, —$SO_2X^1$, $SO_2NX^2X^3$, or —$SO_3X^4$, wherein $X^1$, $X^2$, $X^3$, and $X^4$ are each independently a hydrogen atom, a substituted or unsubstituted alkyl group, a substituted or unsubstituted aryl group, or a substituted or unsubstituted heterocyclic group; at least one of $R^1$ or $R^2$ has an ionic hydrophilic group; and k and 1 are each independently an integer ranging from 1 to 3.

34. The dye-based gray ink formulation of claim 33, wherein the cyan dye is a blue dye that includes compounds defined by structure D:

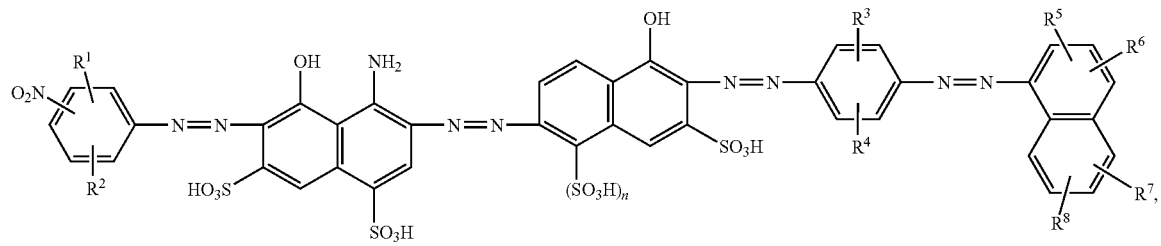

Structure D wherein $R^1$ and $R^2$ are each independently a hydrogen, a halogen, a cyano group, a carboxy group, a sulfo group, a sulfamoyl group, a N-alkylaminosulfonyl group, or a N-phenylaminosulfonyl group; and $R^3$, $R^4$, $R^5$, $R^6$, $R^7$, and $R^8$ are each independently a hydrogen, a halogen group, a hydroxy group, a cyano group, a carboxy group, a sulfo group, a sulfamoyl group, a N-alkylaminosulfonyl group, or a N-phenylaminosulfonyl group.

35. The dye-based gray ink formulation of claim 25, wherein the cyan dye is a blue dye that includes compounds defined by structure D:

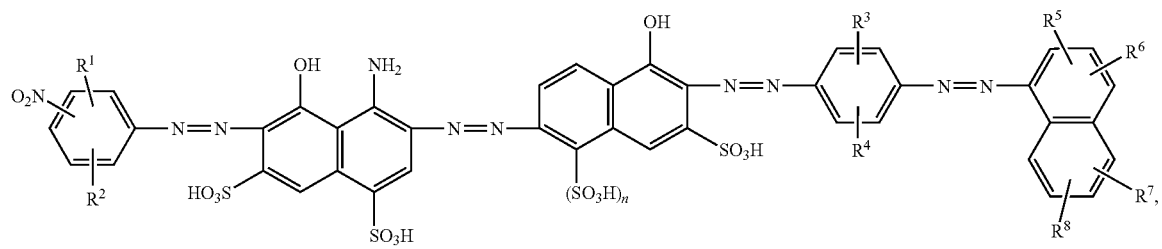

Structure D wherein $R^1$ and $R^2$ are each independently a hydrogen, a halogen, a cyano group, a carboxy group, a sulfo group, a sulfamoyl group, a N-alkylaminosulfonyl group, or a N-phenylaminosulfonyl group; and $R^3$, $R^4$, $R^5$, $R^6$, $R^7$, and $R^8$ are each independently a hydrogen, a halogen group, a hydroxy group, a cyano group, a carboxy group, a sulfo group, a sulfamoyl group, a N-alkylaminosulfonyl group, or a N-phenylaminosulfonyl group.

36. A dye-based gray ink formulation comprising: a yellow dye, a magenta dye, and a cyan dye, the dye-based gray ink formulation having a L* of about 10 to 90 and a c*<10, wherein the dye-based gray ink formulation does not include a black dye, and wherein the cyan dye is a blue dye that includes compounds defined by structure D:

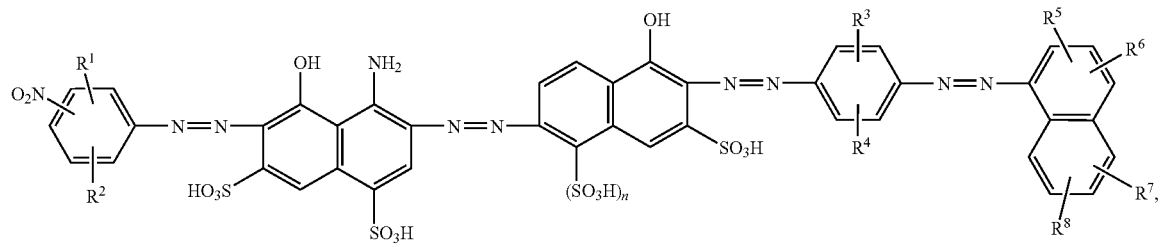

Structure D wherein $R^1$ and $R^2$ are each independently a hydrogen, a halogen, a cyano group, a carboxy group, a sulfo group, a sulfamoyl group, a N-alkylaminosulfonyl group, or a N-phenylaminosulfonyl group; and $R^3$, $R^4$, $R^5$, $R^6$, $R^7$, and $R^8$ are each independently a hydrogen, a halogen group, a hydroxy group, a cyano group, a carboxy group, a sulfo group, a sulfamoyl group, a N-alkylaminosulfonyl group, or a N-phenylaminosulfonyl group.

* * * * *

UNITED STATES PATENT AND TRADEMARK OFFICE
CERTIFICATE OF CORRECTION

| | |
|---|---|
| PATENT NO. | : 8,328,921 B2 |
| APPLICATION NO. | : 12/743803 |
| DATED | : December 11, 2012 |
| INVENTOR(S) | : Cory J. Ruud et al. |

It is certified that error appears in the above-identified patent and that said Letters Patent is hereby corrected as shown below:

In the Specifications

In column 7, line 29, delete "R1 and R2" and insert -- $R^1$ and $R^2$ --, therefor.

In column 7, lines 32-33, delete "R3, R4, R5, R6, R7, and R8" and insert -- $R^3$, $R^4$, $R^5$, $R^6$, $R^7$, and $R^8$ --, therefor.

In the Claims

In column 12, line 46, in Claim 7, delete "wherein k and 1" and insert -- k and 1 --, therefor.

In column 14, line 30, in Claim 11, delete "$nR^3$," and insert -- $R^3$, --, therefor.

In column 18, line 43, in Claim 19, delete "R," and insert -- $R^7$, --, therefor.

In column 22, lines 31-34, in Claim 28, delete "$$M-P\begin{matrix}(R^1)_k \\ (R^2)_l\end{matrix}$$" and insert -- $$M-P\begin{matrix}(R^1)_k \\ (R^2)_l\end{matrix}$$ --, therefor.

In column 22, line 46, in Claim 28, delete "wherein k and 1" and insert -- k and 1 --, therefor.

In column 23, line 11, in Claim 30, after "gray" delete "black".

Signed and Sealed this
Twenty-third Day of April, 2013

Teresa Stanek Rea
*Acting Director of the United States Patent and Trademark Office*

CERTIFICATE OF CORRECTION (continued)
U.S. Pat. No. 8,328,921 B2

In column 24, line 30, in Claim 32, delete "$R^1$," and insert -- $R^1$ --, therefor.

In column 24, lines 48-51, in Claim 33, delete " 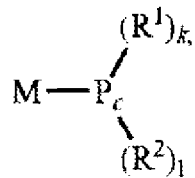 " and insert -- 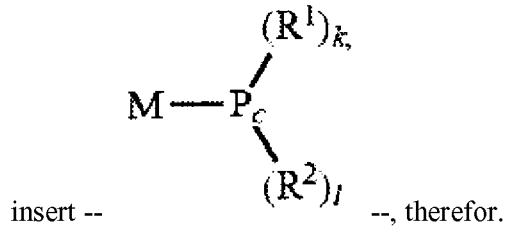 --, therefor.

In column 25, line 59, in Claim 35, delete "and a" and insert -- a --, therefor.